United States Patent
Selvam

(10) Patent No.: US 11,477,932 B2
(45) Date of Patent: Oct. 25, 2022

(54) WIDTH ADJUSTABLE RIPPER ASSEMBLY

(71) Applicant: Caterpillar Inc., Peoria, IL (US)

(72) Inventor: Sudhagar Selvam, Chennai (IN)

(73) Assignee: Caterpillar Inc., Peoria, IL (US)

( * ) Notice: Subject to any disclaimer, the term of this patent is extended or adjusted under 35 U.S.C. 154(b) by 231 days.

(21) Appl. No.: 16/791,670

(22) Filed: Feb. 14, 2020

(65) Prior Publication Data

US 2020/0288619 A1 Sep. 17, 2020

(30) Foreign Application Priority Data

Mar. 13, 2019 (IN) .............................. 201911009690

(51) Int. Cl.
| | |
|---|---|
| *A01B 63/02* | (2006.01) |
| *E02F 5/32* | (2006.01) |
| *A01B 63/10* | (2006.01) |
| *A01B 35/14* | (2006.01) |

(52) U.S. Cl.
CPC ............ *A01B 63/023* (2013.01); *A01B 35/14* (2013.01); *A01B 63/10* (2013.01); *E02F 5/32* (2013.01)

(58) Field of Classification Search
CPC ..... A01B 63/023; A01B 63/10; A01B 63/102; A01B 35/14; E02F 5/32
See application file for complete search history.

(56) References Cited

U.S. PATENT DOCUMENTS

| | | | |
|---|---|---|---|
| 4,013,129 A | 3/1977 | Wilkinson | |
| 4,152,991 A * | 5/1979 | Stedman et al. ........ | B60F 1/00 104/7.1 |
| 4,327,509 A * | 5/1982 | Bean ........................ | E02F 3/32 37/303 |
| 4,729,435 A * | 3/1988 | Urich ..................... | A01B 13/08 172/196 |
| 5,743,338 A | 4/1998 | Gomez et al. | |
| 5,911,279 A * | 6/1999 | Whitener ............... | A01B 63/10 172/668 |
| 6,244,355 B1 * | 6/2001 | Hall ....................... | A01B 11/00 172/40 |
| 6,311,784 B1 * | 11/2001 | Clarke ..................... | E02F 5/32 172/463 |
| 7,322,133 B2 | 1/2008 | Horton | |
| 8,626,401 B2 | 1/2014 | Tomich | |
| 8,752,643 B2 | 6/2014 | Shekleton | |
| 9,062,437 B2 * | 6/2015 | Hall ....................... | E02F 9/2033 |
| 2002/0144830 A1 | 10/2002 | Steinlage et al. | |

(Continued)

FOREIGN PATENT DOCUMENTS

| | | |
|---|---|---|
| AU | 6032086 | 2/1987 |
| WO | WO 82/003525 A1 | 10/1982 |

*Primary Examiner* — Tara Mayo-Pinnock

(57) ABSTRACT

A ripper assembly for a machine includes a main ripper unit and at least one auxiliary ripper unit. The main ripper unit is adapted to be coupled to a frame of the machine and is moveable relative to the frame along a height of the machine. The main ripper unit includes a main ripper. The auxiliary ripper unit is pivotably coupled to the main ripper unit, and is pivotable infinitely between a first position and a second position with respect to the main ripper unit. A distance between the main ripper unit and the auxiliary ripper unit, defined laterally in relation to a direction of travel of the machine, varies as the auxiliary ripper unit pivots from the first position to the second position.

20 Claims, 8 Drawing Sheets

(56) References Cited

U.S. PATENT DOCUMENTS

| | | |
|---|---|---|
| 2009/0050340 A1 | 2/2009 | McIntyre |
| 2009/0199441 A1 | 8/2009 | Jorgensen et al. |
| 2018/0179729 A1* | 6/2018 | Eckrote et al. ....... E02F 3/7604 |
| 2020/0288619 A1* | 9/2020 | Selvam ................ A01B 63/023 |

* cited by examiner

WIDTH ADJUSTABLE RIPPER ASSEMBLY

TECHNICAL FIELD

The present disclosure relates to ripper assemblies for machines such as track-type tractors. More particularly, the present disclosure relates to a ripper assembly having multiple rippers that are used for ripping materials, such as soil, rock, concrete, and where a space between the rippers may be adjusted.

BACKGROUND

Machines with ripper assemblies are widely used in fields of agriculture, construction, etc., to alter a ground surface and/or to break up underlying rock formations. For example, ripper assemblies are coupled to a frame of the machine, brought low to engage the ground surface, and the machine is moved so that along with the movement of the machine, the ripper assembly may rip strata off of the ground surface in order to alter the ground surface. For a relatively soft ground surface, one or more ripper blades of the ripper assembly may be lowered to a maximum depth to effectively break and loosen the ground surface. For a relatively hard ground surface, the ripper blades may be lowered only up to a minimum depth so as to avoid transfer of excessive operational stresses to the ripper blades and the many surrounding components. With minimum depth maintained over a relatively hard ground surface, the ripper blades generally fail to effectively alter the materials of the ground surface. Especially, the ground surface along a gap between two adjacent ripper blades remains unaltered when the surface is hard. In many cases, the machine may need to execute numerous passes over and across the same portion of the ground surface to attain the minimum degree of ground alteration, making the process costly, laborious, and time intensive.

U.S. Pat. No. 5,743,338 ('338 reference) relates to an agricultural implement. The implement includes a shredder having a hood structure with end panels welded to each side of the hood structure. The hood structure receives a toolbar extending along a width of the implement. The '338 reference is silent on the ability of the shredder to be used for altering hard ground.

SUMMARY OF THE INVENTION

In one aspect, the disclosure is directed towards a ripper assembly for a machine. The ripper assembly includes a main ripper unit and at least one auxiliary ripper unit. The main ripper unit is adapted to be coupled to a frame of the machine and is moveable relative to the frame along a height of the machine. The main ripper unit includes a main ripper adapted to rip strata up to a depth beneath a surface underlying the main ripper unit. The auxiliary ripper unit is pivotally coupled to the main ripper unit, and is pivotable between a first position and a second position (including any intermediate position between the first position and the second position) with respect to the main ripper unit, where a distance between the main ripper unit and the auxiliary ripper unit, defined laterally in relation to a direction of travel of the machine, varies as the auxiliary ripper unit pivots from the first position to the second position.

In another aspect, the disclosure relates to a machine. The machine includes a frame, an implement, and a ripper assembly. The frame defines a forward end and a rearward end. The implement is coupled to the forward end and is adapted to receive material during a travel of the machine in a direction defined from the rearward end towards the forward end. The ripper assembly is coupled to the rearward end. The ripper assembly includes a main ripper unit and at least one auxiliary ripper unit. The main ripper unit is coupled to the frame and is moveable relative to the frame along a height of the machine. The main ripper unit also includes a main ripper adapted to rip strata up to a depth beneath a surface underlying the main ripper unit. The auxiliary ripper unit is pivotably coupled to the main ripper unit, and is pivotable between a first position and a second position (including any intermediate position between the first position and the second position) with respect to the main ripper unit. A distance between the main ripper unit and the auxiliary ripper unit, defined laterally in relation to a direction of travel of the machine, varies as the auxiliary ripper unit pivots from the first position to the second position.

DETAILED DESCRIPTION

Reference will now be made in detail to specific embodiments or features, examples of which are illustrated in the accompanying drawings. Generally, corresponding reference numbers will be used throughout the drawings to refer to the same or corresponding parts.

Figure 1:
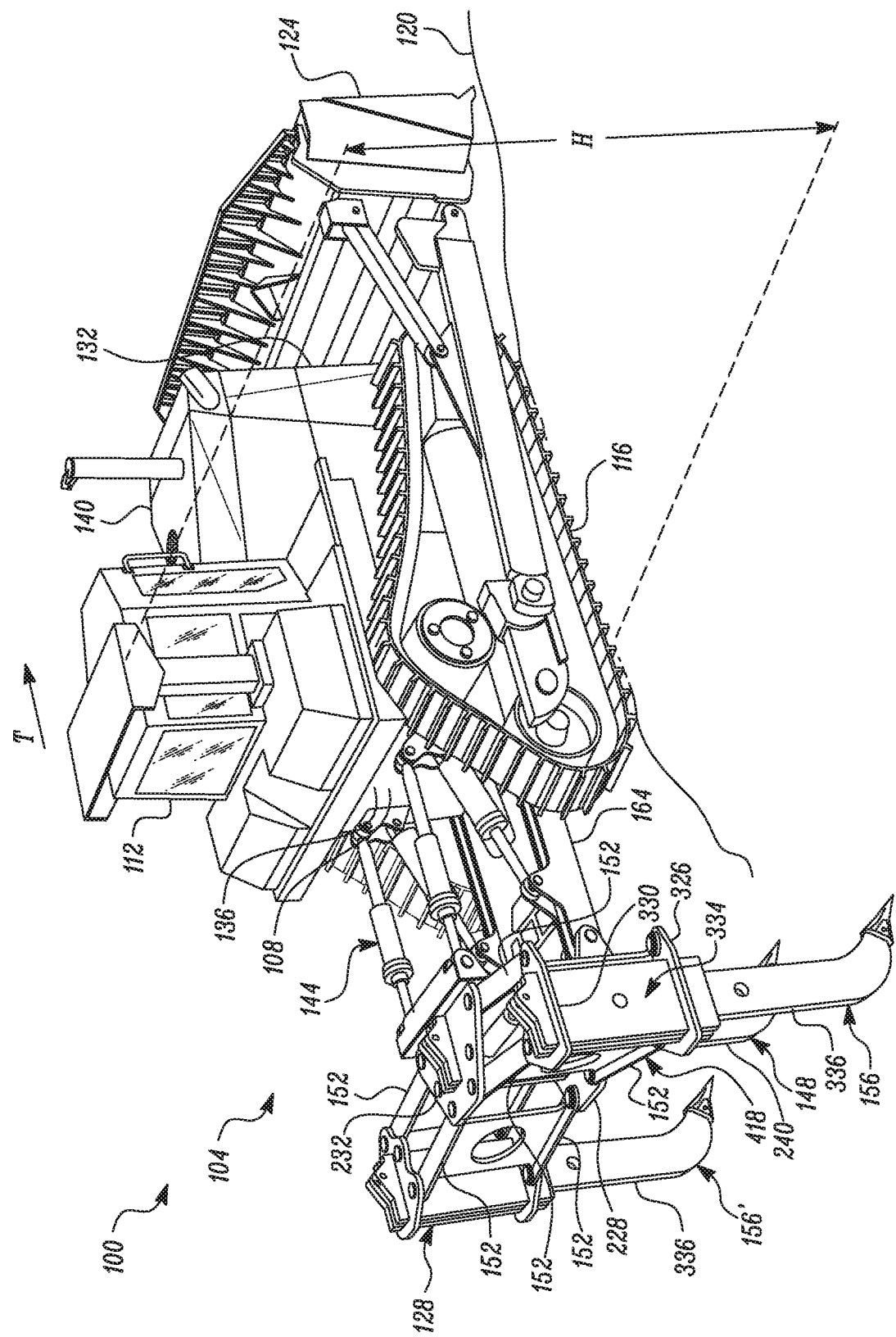
FIG. 1 is an exemplary machine including a ripper assembly, in accordance with an embodiment of the present disclosure.

Referring to FIG. 1, a machine 100 is shown. The machine 100 may be a track type tractor 104, although aspects of the present disclosure may be suitably applied to a variety of other machines, such as agricultural machines, including wheeled tractors, harvesting machines, and the like. The machine 100 may include a frame 108, an operator cab 112 supported on the frame 108, a tracked undercarriage 116 to support and provide traction and mobility to the overall machine 100 over ground 120, an implement 124, and a ripper assembly 128. The present disclosure may include references, such as 'soil', 'underlying surface', and the like, interchangeably used with the reference 'ground 120'.

The frame 108 may include a rigid structure to which nearly every other component (and/or sub-component) of the machine 100 may be coupled to. For example, the frame 108 may support the operator cab 112 that may be in turn applied to accommodate/station one or more operators of the machine 100 for the control of the many functions of the machine 100. The frame 108 may define a forward end 132 and a rearward end 136. The terms 'forward' and 'rearward', as used herein, are in relation to a direction of travel of the machine 100, as represented by arrow, T, in FIG. 1, with said direction of travel being exemplarily defined from the rearward end 136 towards the forward end 132. A movement of the machine 100 (e.g., by way of powering the tracked undercarriage 116) may be facilitated by a power source, such as an internal combustion engine (not shown), housed in a power compartment 140 of the machine 100.

The implement 124 may be coupled to the forward end 132 of the frame 108, so as to engage and/or receive material during a travel of the machine 100 in a direction defined from the rearward end 136 towards the forward end 132 (i.e., arrow, T). In some embodiments, the implement 124 may be movable relative to the frame 108 of the machine 100 to assume a variety of the positions relative to the ground 120 and thus perform various related operations on the ground 120, although, in some cases, the implement 124 may be deployed in a fixed state relative to the frame 108. The implement 124 may include a blade, as shown, although the implement 124 may be representative of various other tools, such as buckets, material pushers, grapples, moldboards, etc., and accordingly, it may be noted that the implement 124, as discussed and depicted in the present disclosure, is purely exemplary. In some embodiments, the implement 124 may be altogether omitted from the machine 100.

Figure 2:
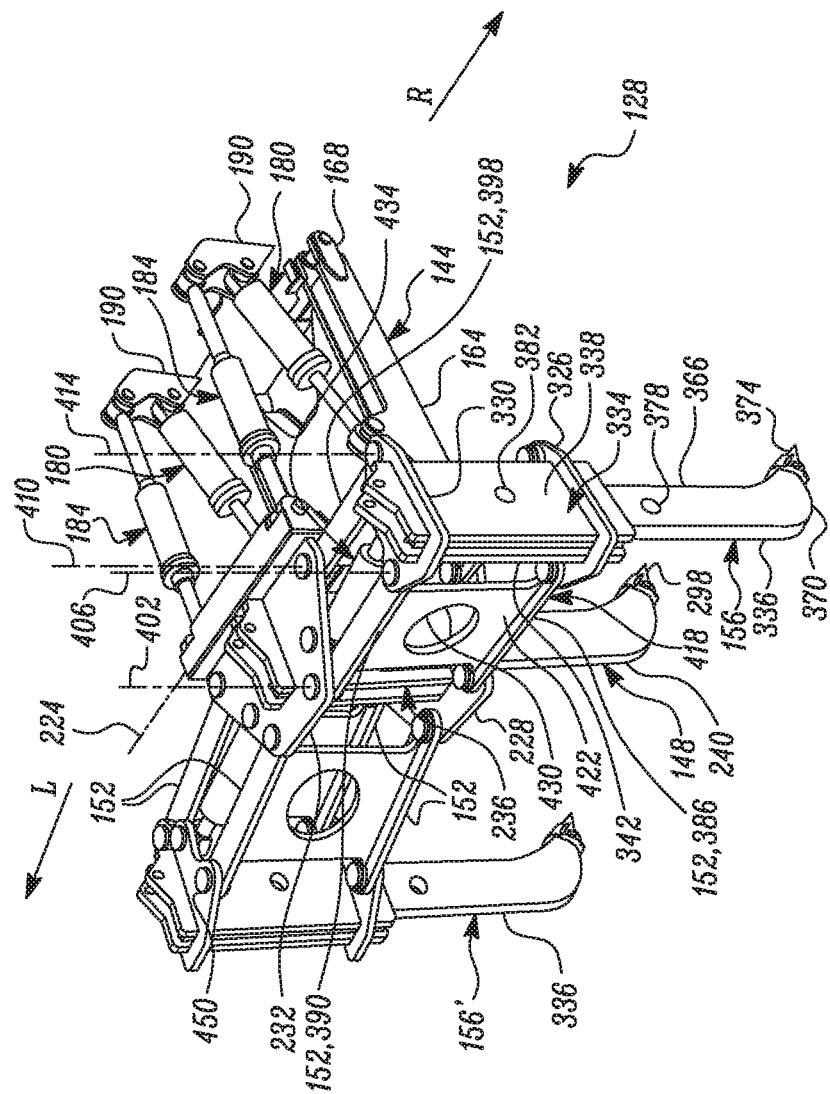
FIG. 2 is a view of the ripper assembly in an assembled state, in accordance with an embodiment of the present disclosure.
Figure 3:
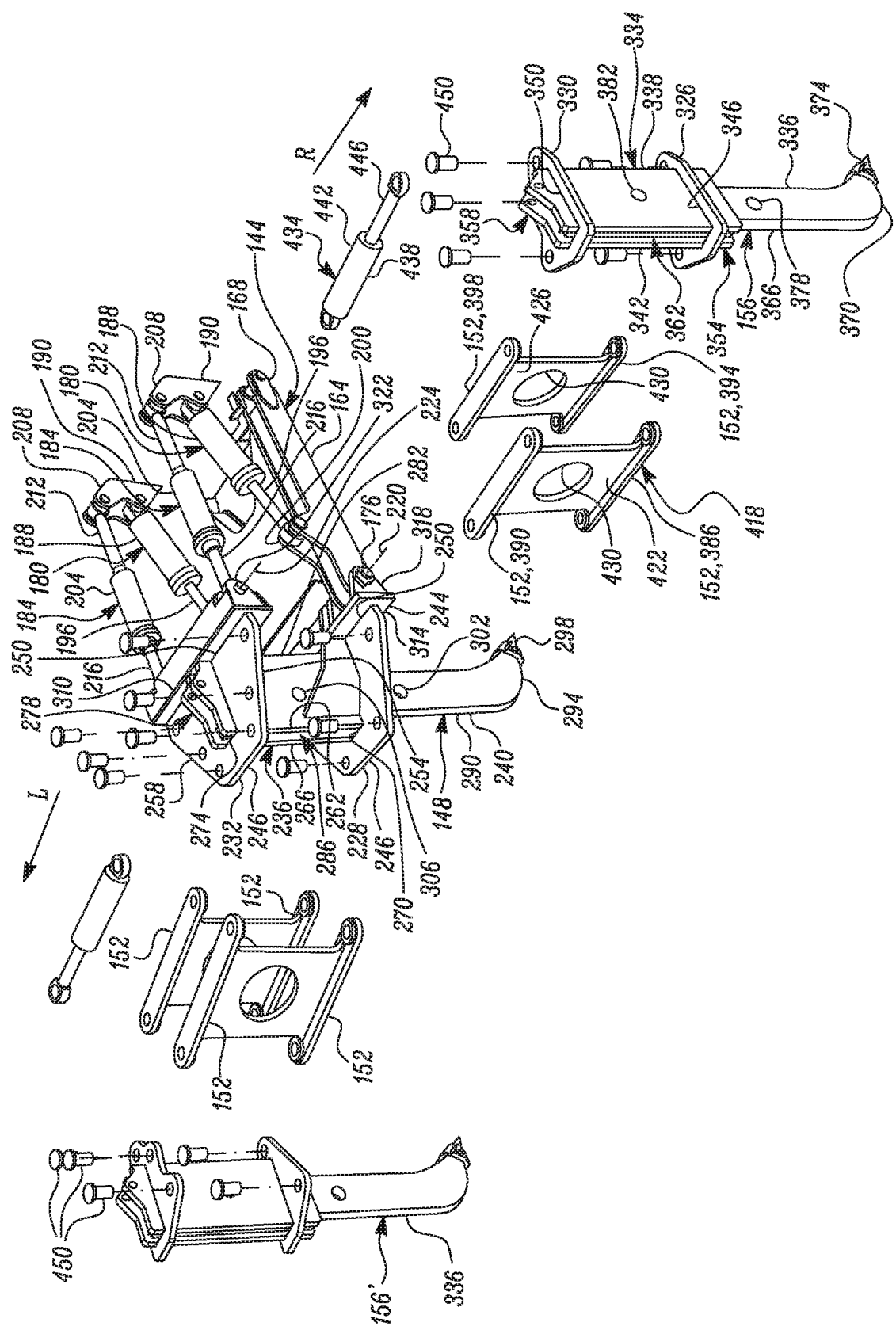
FIG. 3 is a view of the ripper assembly in an exploded state.

Referring to FIGS. 2 and 3, the ripper assembly 128 may be coupled to the rearward end 136 of the frame 108, and may be adapted to alter the ground 120 during a travel of the machine 100 along direction, T. To this end, the ripper assembly 128 includes an articulation mechanism 144, a main ripper unit 148, a plurality of links 152, a first auxiliary ripper unit 156, and a second auxiliary ripper unit 156', as shown. Various details with regard to the aforementioned components of the ripper assembly 128 will now be discussed.

Referring to FIG. 3, the articulation mechanism 144 is configured to movably couple the main ripper unit 148 to the frame 108 (i.e., to the rearward end 136 of the frame 108) and is configured to facilitate a movement of the main ripper unit 148 along a height, H, of the machine 100 (FIG. 1). The articulation mechanism 144 includes a sub-frame structure 164 that includes an end 168 which is pivotably coupled to a portion 172 of the frame 108 (i.e., of the rearward end 136 of the frame 108) (FIGS. 5 and 6), and another end 176 disposed remote and away from the frame 108. Further, the articulation mechanism 144 includes a pair of first actuators 180 and a pair of second actuators 184, each working on hydraulic actuation principles having a cylinder-rod based arrangement—where the rod of said actuators may be extended and retracted with respect to the cylinder of said actuators based on an influx/release of fluid into/from the cylinder.

According to the depicted embodiment, cylinders 188 of the first actuators 180 may be coupled to the rearward end 136 of the frame 108 (but exemplarily at an elevated portion 192 with respect to the portion 172) (FIGS. 5 and 6), while rods 196 of the first actuators 180 may be coupled to a portion 200 of the sub-frame structure 164 that is closer to the end 176 than to the end 168. In that manner, an extension of the rods 196 of the first actuators 180 causes the sub-frame structure 164 to pivot about the portion 172 and move lower along the height, H, towards the ground 120 (see arrow, PL, FIG. 6), while a retraction of the rods 196 of the first actuators 180 causes the sub-frame structure 164 to be pulled above, away from the ground 120, along the height, H (see arrow, PA, FIG. 5). According to the disclosed embodiment, the cylinders 188 of the first actuators 180 may be coupled to the rearward end 136 of the frame 108 by way of respective brackets 190. In effect, the main ripper unit 148 is adapted to be coupled to the frame 108 and moveable relative to the frame 108 along the height, H, of the machine 100. It may be noted that each of the first actuators 180 may work synchronously (i.e., the rods 196 of the first actuators 180 may be adapted to extend and retract synchronously with respect to the respective cylinders 188 of the first actuators 180) to attain the aforementioned movements of the sub-frame structure 164.

Figure 5:
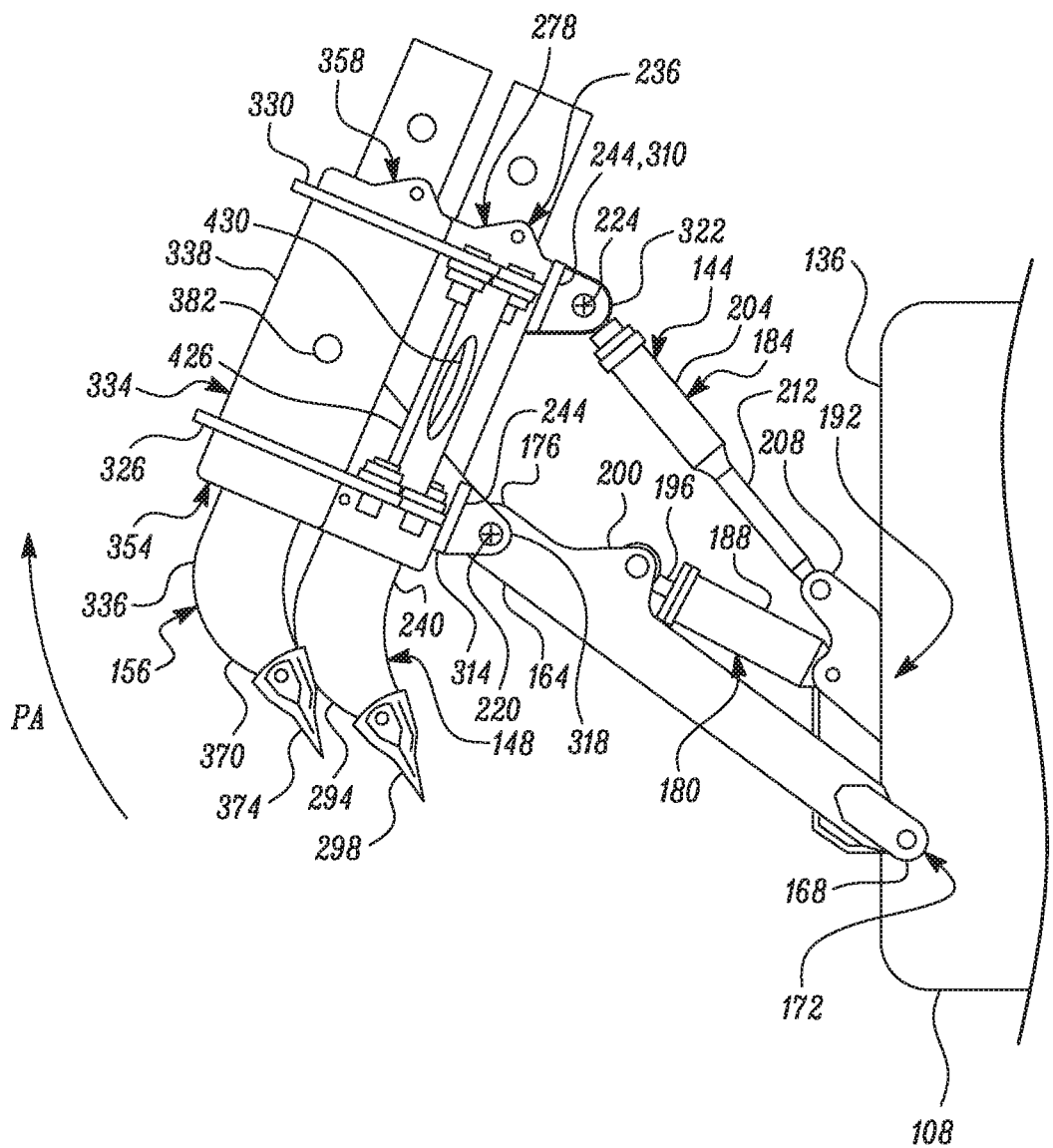
FIG. 5 is the ripper assembly in a fully-up position with respect to a frame of the machine, in accordance with an embodiment of the present disclosure.
Figure 6:
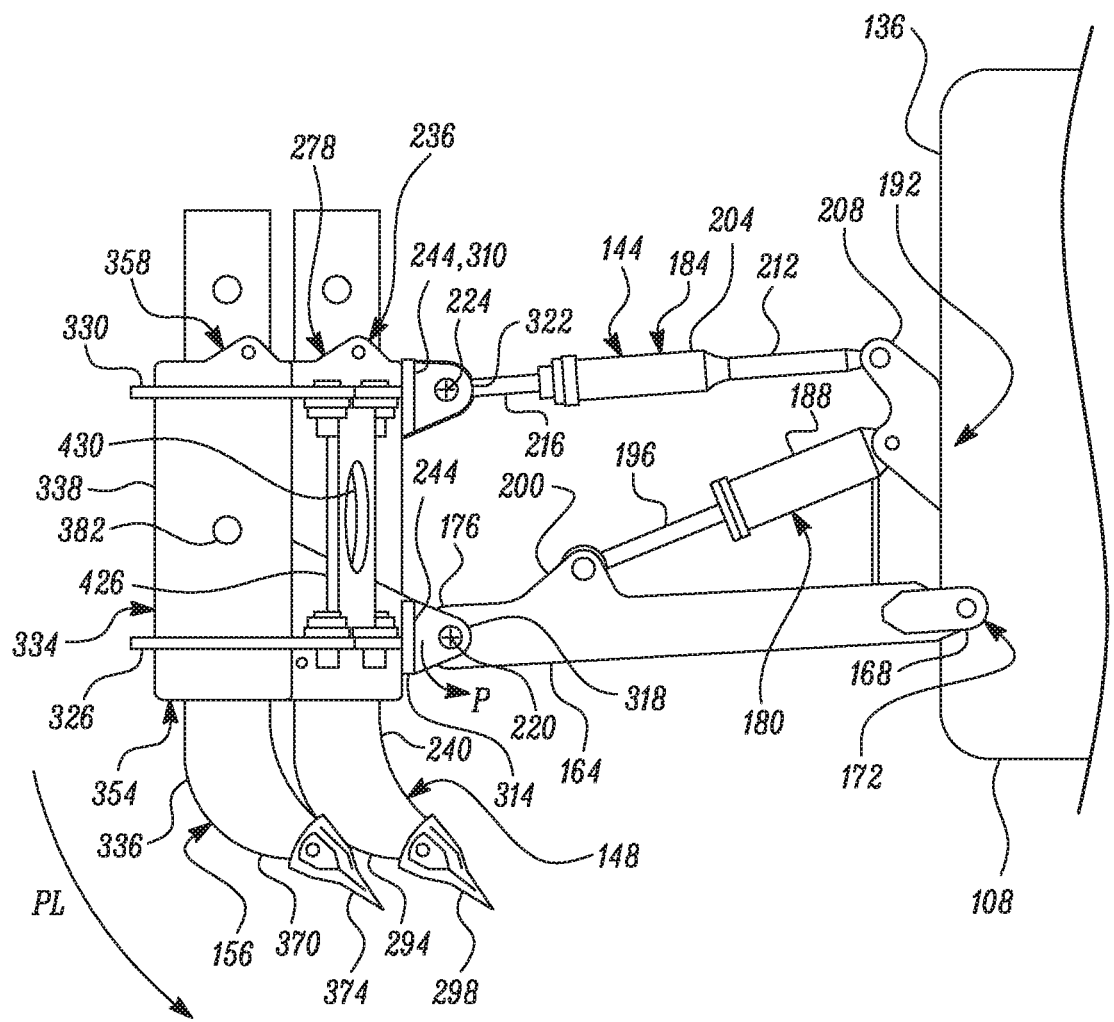
FIG. 6 is the ripper assembly in a fully-down position with respect to the frame of the machine, in accordance with an embodiment of the present disclosure.

Cylinders 204 of the second actuators 184 may be coupled (pivotably) to respective sections 208 on the brackets 190 that is further elevated with respect to the elevated portion 192 on the rearward end 136 of the frame 108 (FIGS. 5 and 6). While in the depicted embodiment, it is suggested that the cylinders 204 of the second actuators 184 are coupled to the sections 208 by way of respective support structures 212, the use of such support structures 212 are optional, and thus may be omitted in certain applications. Further, rods 216 of the second actuators 184 may be telescopically extendable and retractable with respect to the respective cylinders 204 of the second actuators 184, and as discussed for the first actuators 180, said rods 216 of the second actuators 184 may be adapted to extend and retract synchronously with respect to the respective cylinders 204 of the second actuators 184.

While it is contemplated that the first actuators 180 and the second actuators 184 may be actuated to move the articulation mechanism 144 between a variety of positions, for the aspects of the present disclosure, it may be noted that the articulation mechanism 144 may be moved between a stowed position and an operational position. The stowed position of the articulation mechanism 144 has been exemplarily depicted in FIG. 5, while the operational position of the articulation mechanism 144 has been exemplarily depicted in FIG. 6. In the stowed position (FIG. 5), it may be noted that the rods 196, 216 of both the first actuators 180 and the second actuators 184 are in a retracted state with respect to their respective cylinders 188, 204 while, in the operational position (FIG. 6), the rods 196, 216 of the both the first actuators 180 and the second actuators 184 are in an extended state with respect to their respective cylinders 188, 204.

With continued reference to FIG. 3, the main ripper unit 148 may be pivotably coupled to the end 176 of the sub-frame structure 164, allowing the main ripper unit 148 to be pivoted or tilted relative to the end 176 of the sub-frame structure 164 about a sub-frame axis 220. Because of the main ripper unit 148's aforesaid connections with the sub-frame structure 164, as the first actuators 180 may cause the sub-frame structure 164 to pivot about the portion 172 and move lower towards the ground 120 (or higher away from the ground 120) along the height, H, (FIG. 1) the first actuators 180 may also in turn cause the main ripper unit 148 to be simultaneously moved along with the movement of the sub-frame structure 164. Further, as shown, the main ripper unit 148 may also be pivotably coupled to the rods 216 of the second actuators 184 (about a tilt axis 224), and, in so doing, a retraction and extension of the rods 216 relative to the cylinders 204 may facilitate the main ripper unit 148 to be controlled during the pivot or tilt about the sub-frame axis 220. The main ripper unit 148 includes and/or may be formed from a number of components. As an example, the main ripper unit 148 includes a first slab 228, a second slab 232, a first pair of slats 236, a main ripper 240, and a set of back plates 244.

The second slab 232 may be spaced apart (and optionally disposed generally parallelly) with respect to the first slab 228. According to the embodiments disclosed and described herein, the second slab 232 is disposed above the first slab 228 along the height, H, of the machine 100 (FIG. 1). The first slab 228 and the second slab 232 may be generally trapezoid-shaped and similarly dimensioned members, as shown, although a shape and dimension of each of the first slab 228 and the second slab 232 may change depending upon factors, such as spatial constraints, weight distribution between various surrounding components, etc. Each of the first slab 228 and the second slab 232 may define two parallel edges (individually referred to as a narrower edge 246 and a broader edge 250) and may further define symmetrically opposed side edges (i.e., a first side edge 254 and a second side edge 258) angularly extending between the narrower edge 246 and the broader edge 250, as shown.

The first pair of slats 236 includes a first slat 262 and a second slat 266. The first slat 262 may be parallel to the second slat 266. The first pair of slats 236 are arranged generally orthogonally between (and are arranged to at least minimally pass through or across each of) the first slab 228 and the second slab 232 to facilitate a fixed deployment of the first slab 228 with respect to the second slab 232—the term 'generally' added here (and elsewhere) may be contemplated to account for manufacturing tolerances. According to an example, the first slab 228 and the second slab 232 include appropriately shaped and respective cutouts 270, 274 that may suitably accommodate end portions (e.g., see end portion 278) of the first pair of slats 236 therethrough. Such end portions may be welded around and/or relative to the edges that define the cutouts 270, 274 allowing the first pair of slats 236 to be retained with the first slab 228 and the second slab 232. For example, the end portion 278 may be welded to the edges defining the cutout 274. Other means of the retaining the first pair of slats 236 with the first slab 228 and the second slab 232, such as by use of industrial adhesives, etc., may be contemplated.

According to an embodiment, the cutout 274 of the second slab 232 may be shaped so as to well accommodate the end portion 278 of the first pair of slats 236 therein, while allowing edges 282 defined by each of the first slat 262 and the second slat 266 (of the first pair of slats 236) to sit flush with the broader edge 250 of the second slab 232, thus imparting a crisscrossed arrangement between the second slab 232 and the first pair of slats 236. Furthermore, the first slat 262 and the second slat 266 of first pair of slats 236 are arranged in such a manner that a space 286 is defined between them.

The main ripper 240 includes a generally longitudinal shape defining a shank portion 290 and an end 294, with a ground engaging tool 298 (e.g., a J-shaped ground engaging tool as shown) disposed and/or coupled to the end 294. The shank portion 290 may be accommodated within the space 286 defined between the first pair of slats 236. According to some embodiments, the shank portion 290 may include multiple holes (see hole 302) formed along a length of the shank portion 290. An aperture 306, similarly sized as the holes (e.g., hole 302) may be formed within one or more of the first slat 262 and the second slat 266 of the first pair of slats 236. In an assembly of the main ripper 240 with the first pair of slats 236, the shank portion 290 may be slid through the space 286 and any one of the holes (e.g., hole 302) formed in the shank portion 290 may be brought into alignment with the aperture 306 formed within the one or more of the first slat 262 and the second slat 266, and thereafter, a pin (not shown) may be passed through each of the hole (e.g., hole 302) and the aperture 306 so as to retain the shank portion 290 (and thus the main ripper 240) within the first pair of slats 236.

The multi-hole provision in the shank portion 290 of the main ripper 240 allows the main ripper 240 to be fixed at various positions (or heights) with respect to the first pair of slats 236, and thus the ground 120. For example, by way of the multi-hole provision in the shank portion 290, the main ripper 240 may be adjusted with respect to the first pair of slats 236 between a fully-down position (i.e., to attain a maximum depth cut into the ground 120) and a fully-up position (i.e., to attain a minimum depth cut into the ground 120). It may be noted that a position of the main ripper 240 with respect to the first pair of slats 236, as depicted in FIGS. 2 and 3, corresponds to the fully-down position of the main ripper 240, while a position of the main ripper 240 with respect to the first pair of slats 236, as depicted in FIGS. 5 and 6, corresponds to the fully-up position of the main ripper 240. In either positions, the main ripper 240 is adapted to rip strata up to a depth beneath a surface (i.e., ground 120) underlying the main ripper unit 148.

Figure 4:
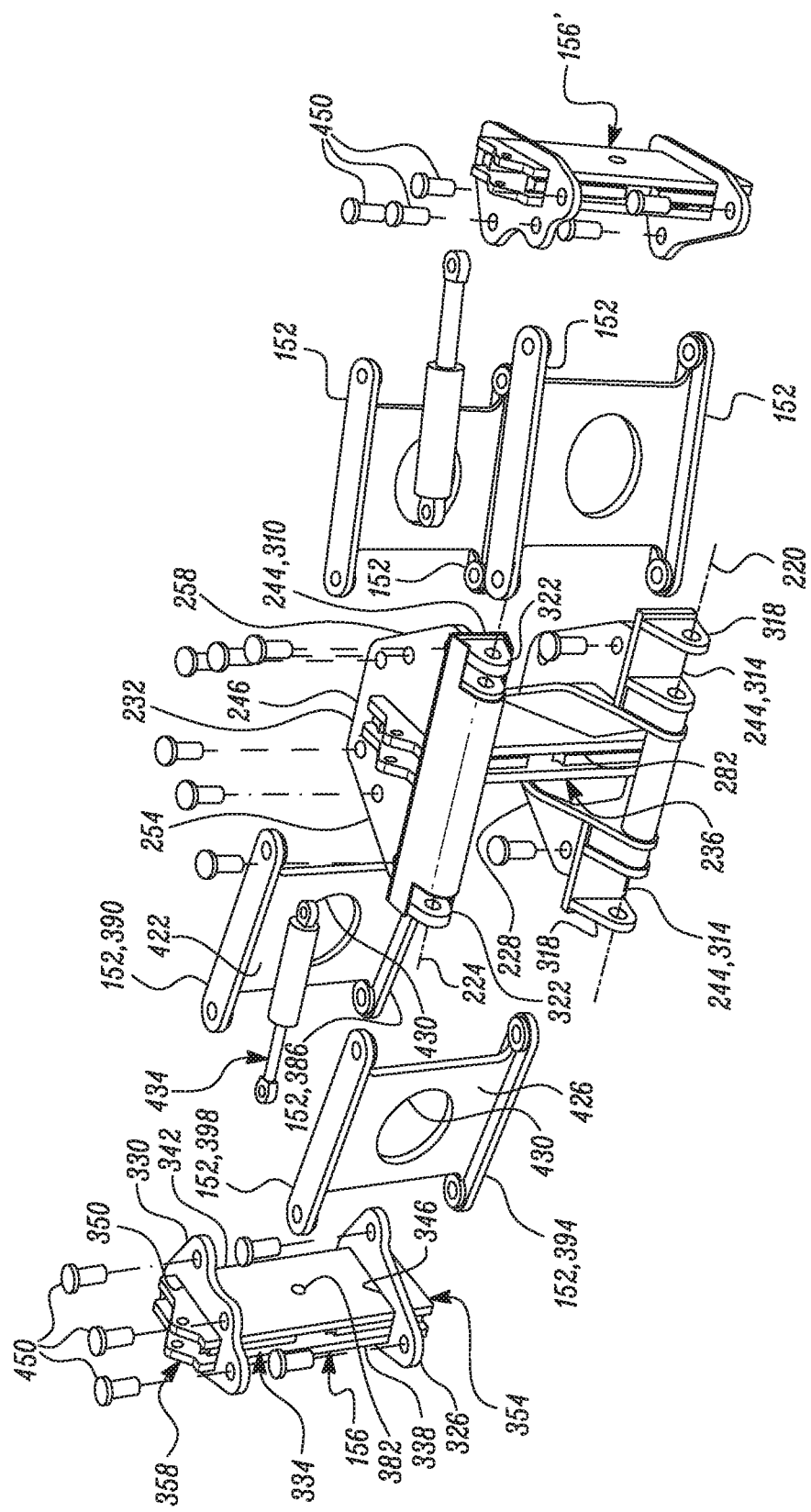
FIG. 4 is another view of the ripper assembly in an exploded state, depicting portions of the ripper assembly not visible in the view of FIG. 3, and with some components of the ripper assembly removed.

Referring to FIGS. 3 and 4, the set of back plates 244 include an upper back plate 310 and two lower back plates 314, as shown. The upper back plate 310 may be a unitary one-piece plate (or, in some embodiments, may be formed from a number of plates) coupled (e.g., by welding) to the second slab 232 at the broader edge 250 (FIG. 3) of the second slab 232, while (optionally) also being coupled (e.g., by welding) to the edges 282 defined by the first pair of slats 236 sitting flush with the broader edge 250 of the second slab 232. The two lower back plates 314 are coupled to the broader edge 250 (FIG. 3) of the first slab 228, and are arranged symmetrically about the first pair of slats 236, as shown in FIG. 4.

According to an aspect of the present disclosure, the main ripper unit 148 includes a pair of first yoke portions 318 and a pair of second yoke portions 322. The pair of first yoke portions 318 are respectively structured and arranged (e.g., by welding) on the two lower back plates 314, while the pair of second yoke portions 322 are structured and arranged (e.g., by welding) on the upper back plate 310. The pair of first yoke portions 318 are adapted to be pivotably coupled to the end 176 of the sub-frame structure 164 (FIG. 3), thus pivotably coupling the main ripper unit 148 with the sub-frame structure 164 about the sub-frame axis 220, while the pair of the second yoke portions 322 are pivotably coupled to the rods 216 of the second actuators 184 (FIG. 3) about the tilt axis 224, thus facilitating the controlled tilt of the main ripper unit 148 with respect to the sub-frame structure 164 about the sub-frame axis 220, upon the actuation of the second actuators 184, as discussed supra. According to an embodiment, the sub-frame axis 220 is parallel to the tilt axis 224.

Referring back to FIGS. 2 and 3, the first auxiliary ripper unit 156 and the second auxiliary ripper unit 156' may be similar to each other and may be disposed on either sides of the main ripper unit 148. In other words, the first auxiliary ripper unit 156 may be pivotably coupled to (by way of one or more of the links 152, discussed later) and disposed on the right-hand side of the main ripper unit 148, while the second auxiliary ripper unit 156' may be pivotably coupled to (by way of one or more of the links 152, discussed later) and disposed on the left-hand side of the main ripper unit 148. The terms left-hand side' and 'right-hand side' may be understood as the machine 100 (FIG. 1) is viewed from the rearward end 136 of the frame 108 towards the forward end 132 of the frame 108, and according to arrow, R, which indicates the right-hand side, and arrow, L, which indicates the left-hand side, as provided in FIGS. 2 and 3. It will be noted that the forthcoming description may include discussions primarily focused towards the first auxiliary ripper unit 156. Such discussions may be equivalently applicable to the second auxiliary ripper unit 156' as well. Wherever required, references to the second auxiliary ripper unit 156', and components thereof, may also be used. Because the first auxiliary ripper unit 156 and the second auxiliary ripper unit 156' are similar to each other, and for clarity, various parts of the second auxiliary ripper unit 156' have not been referred to or annotated, as they may be understood to remain similar to the components of the first auxiliary ripper unit 156. For ease, the first auxiliary ripper unit 156 may be simply referred to as auxiliary ripper unit 156. The auxiliary ripper unit 156 includes a third slab 326, a fourth slab 330, a second pair of slats 334, and an auxiliary ripper 336.

Referring back to FIG. 3, the fourth slab 330 may be spaced apart (and optionally disposed generally parallelly) with respect to the third slab 326. According to the embodiments disclosed and described herein, the fourth slab 330 is disposed above the third slab 326 along the height, H, of the machine 100 (FIG. 1). The third slab 326 and the fourth slab 330 may generally include a planarly extending, flat body structure, as shown. A shape of the each of the third slab 326 and the fourth slab 330 may be irregular/undefined, as shown, although it is possible for the third slab 326 and the fourth slab 330 to include any of the conventionally available, well known shapes. For example, the third slab 326 and the fourth slab 330 may be rectangular shaped, or, the shape of the third slab 326 and the fourth slab 330 may be determined based on various parameters associated with a working of the auxiliary ripper unit 156—for example, spatial constraints as the auxiliary ripper unit 156 may pivotably move with respect to the main ripper unit 148, weight distribution with regard to one or more surrounding components, etc. Accordingly, a shape and dimension of each of the third slab 326 and the fourth slab 330 need to be viewed as being purely exemplary.

The second pair of slats 334 may be similar to the first pair of slats 236 of the main ripper unit 148. The second pair of slats 334 includes a third slat 338 and a fourth slat 342. The third slat 338 may be parallel to the fourth slat 342. The second pair of slats 334 are arranged generally orthogonally between (and are arranged to at least minimally pass through or across each of) the third slab 326 and the fourth slab 330 to facilitate a fixed deployment of the third slab 326 with respect to the fourth slab 330. According to an example, the third slab 326 and the fourth slab 330 includes cutouts 346, 350 that may be appropriately shaped to accommodate end portions 354, 358 of the second pair of slats 334 therethrough. Said end portions 354, 358 may be welded around and/or relative to the edges that define the cutouts 346, 350 allowing the second pair of slats 334 to be retained with the third slab 326 and the fourth slab 330. Other means of the retaining the second pair of slats 334 with the third slab 326 and the fourth slab 330, such as by use of industrial adhesives, may be contemplated. The third slat 338 and the fourth slat 342 of second pair of slats 334 are arranged in such a manner that a space 362 is defined between them. According to an embodiment, a distance defined between the third slab 326 and the fourth slab 330 may be the same as a distance defined between the first slab 228 and the second slab 232.

The auxiliary ripper 336 may be identical to the main ripper 240, and accordingly, includes a generally longitudinal shape defining a shank portion 366 and an end 370, and a ground engaging tool 374 (e.g., a J-shaped ground engaging tool, as shown) disposed and/or coupled to the end 370. The shank portion 366 may be accommodated within the space 362 defined between the second pair of slats 334. According to some embodiments, the shank portion 366 may include multiple holes (see hole 378) formed along a length of the shank portion 366. An aperture 382, similarly sized as the holes (e.g., hole 378) may be formed within one or more of the third slat 338 and the fourth slat 342 of the second pair of slats 334. In an assembly of the auxiliary ripper 336 with the second pair of slats 334, the shank portion 366 may be slid through the space 362 and any one of the holes (e.g., hole 378) formed in the shank portion 366 may be brought into alignment with the aperture 382 formed within one or more of the third slat 338 and the fourth slat 342, and thereafter, a pin (not shown) may be passed through each of the hole (e.g., hole 378) and the aperture 382 so as to retain the shank portion 366 (and thus the auxiliary ripper 336) within the second pair of slats 334.

The multi-hole provision in the shank portion 366 of the auxiliary ripper 336 allows the auxiliary ripper 336 to be fixed at various positions (or heights) with respect to the second pair of slats 334, and thus the ground 120. For example, by way of the multi-hole provision in the shank portion 366, the auxiliary ripper 336 may be adjusted with respect to the second pair of slats 334 between a fully-down position (i.e., to attain a maximum depth cut into the ground 120) and a fully-up position (i.e., to attain a minimum depth cut into the ground 120). It may be noted that a position of the auxiliary ripper 336 with respect to the second pair of slats 334, as depicted in FIGS. 2 and 3, corresponds to the fully-down position of the auxiliary ripper 336, while a position of the auxiliary ripper 336 with respect to the second pair of slats 334, as depicted in FIGS. 5 and 6, corresponds to the fully-up position of the auxiliary ripper 336. In either positions, the auxiliary ripper 336 may be adapted to rip strata up to a depth beneath a surface (i.e., ground 120) underlying the auxiliary ripper unit 156.

In some embodiments, it may be contemplated that the main ripper unit 148 may include additional slabs (e.g., sized and shaped similarly to the first slab 228 and the second slab 232) disposed between the first slab 228 and the second slab 232. Such additional slabs may serve to reinforce the overall structure of the main ripper unit 148. Similarly, it may be contemplated that the auxiliary ripper unit 156 may include additional slabs (e.g., sized and shaped similarly to the third slab 326 and the fourth slab 330) disposed between the third slab 326 and the fourth slab 330. Such additional slabs may serve to reinforce the overall structure of the auxiliary ripper unit 156.

The links 152 will now be discussed. The links 152 include a first link 386, a second link 390, a third link 394, and a fourth link 398. The first link 386 is pivotably coupled to the main ripper unit 148 about a first axis 402 (FIG. 2) and is pivotably coupled to the auxiliary ripper unit 156 about a second axis 406 (FIG. 2). Similarly, the second link 390 is pivotably coupled to the main ripper unit 148 about the first axis 402 and is pivotably coupled to the auxiliary ripper unit 156 about the second axis 406. For example, the first link 386 is pivotably coupled to the first slab 228 about the first axis 402, while the second link 390 is pivotably coupled to the second slab 232 about the first axis 402. Further, the first link 386 is pivotably coupled to the third slab 326 about the second axis 406, while the second link 390 is pivotably coupled to the fourth slab 330 about the second axis 406. According to an embodiment, given that the distance defined between the first slab 228 and the second slab 232 is equal to the distance defined between the third slab 326 and the fourth slab 330, the first link 386 and the second link 390 may be disposed spaced apart from each other. In some examples, the first link 386 and the second link 390 may also be parallelly disposed with respect to each other.

The third link 394 is pivotably coupled to the main ripper unit 148 about a third axis 410 (FIG. 2) and is pivotably coupled to the auxiliary ripper unit 156 about a fourth axis 414 (FIG. 2). Similarly, the fourth link 398 is pivotably coupled to the main ripper unit 148 about the third axis 410 and is pivotably coupled to the auxiliary ripper unit 156 about the fourth axis 414. For example, the third link 394 is pivotably coupled to the first slab 228 about the third axis 410, while the fourth link 398 is pivotably coupled to the second slab 232 about the third axis 410. Further, the third link 394 is pivotably coupled to the third slab 326 about the fourth axis 414, while the fourth link 398 is pivotably coupled to the fourth slab 330 about the fourth axis 414. According to an embodiment, given that the distance defined between the first slab 228 and the second slab 232 is equal to the distance defined between the third slab 326 and the fourth slab 330, the third link 394 and the fourth link 398 may be disposed spaced apart from each other. In some examples, the third link 394 and the fourth link 398 may also be parallelly disposed with respect to each other.

In some embodiments, each of the first link 386, the second link 390, the third link 394, and the fourth link 398, are generally parallelly disposed with respect to each other. According to one further example, each of the first axis 402, the second axis 406, the third axis 410, and the fourth axis 414, are parallelly defined with respect to each other. Effectively, the arrangement of the links 152, as formed, may resemble a four-bar linkage assembly 418 or a parallelepiped-based linkage arrangement 418 (also see FIG. 2). Effectively, the auxiliary ripper unit 156 may be pivotably coupled to the main ripper unit 148 by way of the four-bar linkage assembly 418 or the parallelepiped-based linkage arrangement 418.

According to some embodiments, and although not limited, each of the first slab 228, the second slab 232, the third slab 326, and the fourth slab 330, may be generally perpendicularly disposed with respect to each of the first axis 402, the second axis 406, the third axis 410, and the fourth axis 414. Further, in some embodiments, each of the first axis 402, second axis 406, third axis 410, and the fourth axis 414, may be perpendicularly disposed with respect to the subframe axis 220 and the tilt axis 224—all through a myriad of movements of the main ripper unit 148 as may be enabled by the first actuators 180 and the second actuators 184 of the articulation mechanism 144.

According to some embodiments, the ripper assembly 128 may include a first plate 422 coupled to (i.e., coupled between) the first link 386 and the second link 390. For example, the first plate 422 may be coupled to the first link 386 and the second link 390 by conventional fastening means, such as by welding. Alternatively, the first link 386, the second link 390, and the first plate 422, may be a single, unitary component, formed by casting material (e.g., a metal) in a single mold. In such a case, the first plate 422 may extend integrally and contiguously between the first link 386 and the second link 390. As with the first plate 422, the ripper assembly 128 may further include a second plate 426 (best shown in FIG. 3) coupled to (i.e., coupled between) the third link 394 and the fourth link 398. For example, the second plate 426 may be coupled to the third link 394 and the fourth link 398 by conventional fastening means, such as by welding. Alternatively, the third link 394, the fourth link 398, and the second plate 426, may be a single, unitary component, formed by casting material (e.g., a metal) in a single mold. In such a case, the second plate 426 may extend integrally and contiguously between the third link 394 and the fourth link 398.

Both the first plate 422 and the second plate 426 may serve to reinforce the connections formed by the links 152 between the main ripper unit 148 and the auxiliary ripper unit 156. According to one or more embodiments, both the first plate 422 and the second plate 426 may include respective apertures 430 (e.g., circular apertures, as shown) that may serve to reduce an overall weight and bulk of the connections between the main ripper unit 148 and the auxiliary ripper unit 156. A size and shape of the apertures 430, however, may vary from what has been depicted, and may be determined based on a minimum reinforcement/strength required for the connections to facilitate effective movement between the main ripper unit 148 and the auxiliary ripper unit 156.

The aforesaid connections the main ripper unit 148 and the auxiliary ripper unit 156, as formed by the parallelepiped-based linkage arrangement 418, facilitates the auxiliary ripper unit 156 to pivot or swing with respect to the main ripper unit 148. According to an embodiment, the auxiliary ripper unit 156 is pivotable between a first position and a second position with respect to the main ripper unit 148. For example, the auxiliary ripper unit 156 is pivotable between the first position and the second position (including any intermediate position between the first position and the second position) with respect to the main ripper unit 148. The first position of the auxiliary ripper unit 156 corresponds to a position where the auxiliary ripper unit 156 is the most laterally disposed, towards the right-hand side of the main ripper unit 148, with respect to the main ripper unit 148 (FIG. 7), while the second position of the auxiliary ripper unit 156 corresponds to a position where the auxiliary ripper unit 156 is the most rearwardly disposed with respect to the main ripper unit 148, while remaining at the right-hand side of the main ripper unit 148 (FIG. 8). Effectively, in the first position, the auxiliary ripper unit 156 is disposed relatively closer to the frame 108, while, in the second position, the auxiliary ripper unit 156 is disposed relatively farther from the frame 108. It may further be noted that as the auxiliary ripper unit 156 is pivoted towards the first position, the auxiliary ripper unit 156 moves relatively closer to the frame 108, and as the auxiliary ripper unit 156 is pivoted towards the second position, the auxiliary ripper unit 156 moves relatively farther from the frame 108. Moreover, while the auxiliary ripper unit 156 executes the pivotal movement between the first position and the second position, the auxiliary ripper unit 156 is able to sweep across a plane that may be disposed largely horizontally with respect to the ground 120, during operations.

Figure 7:
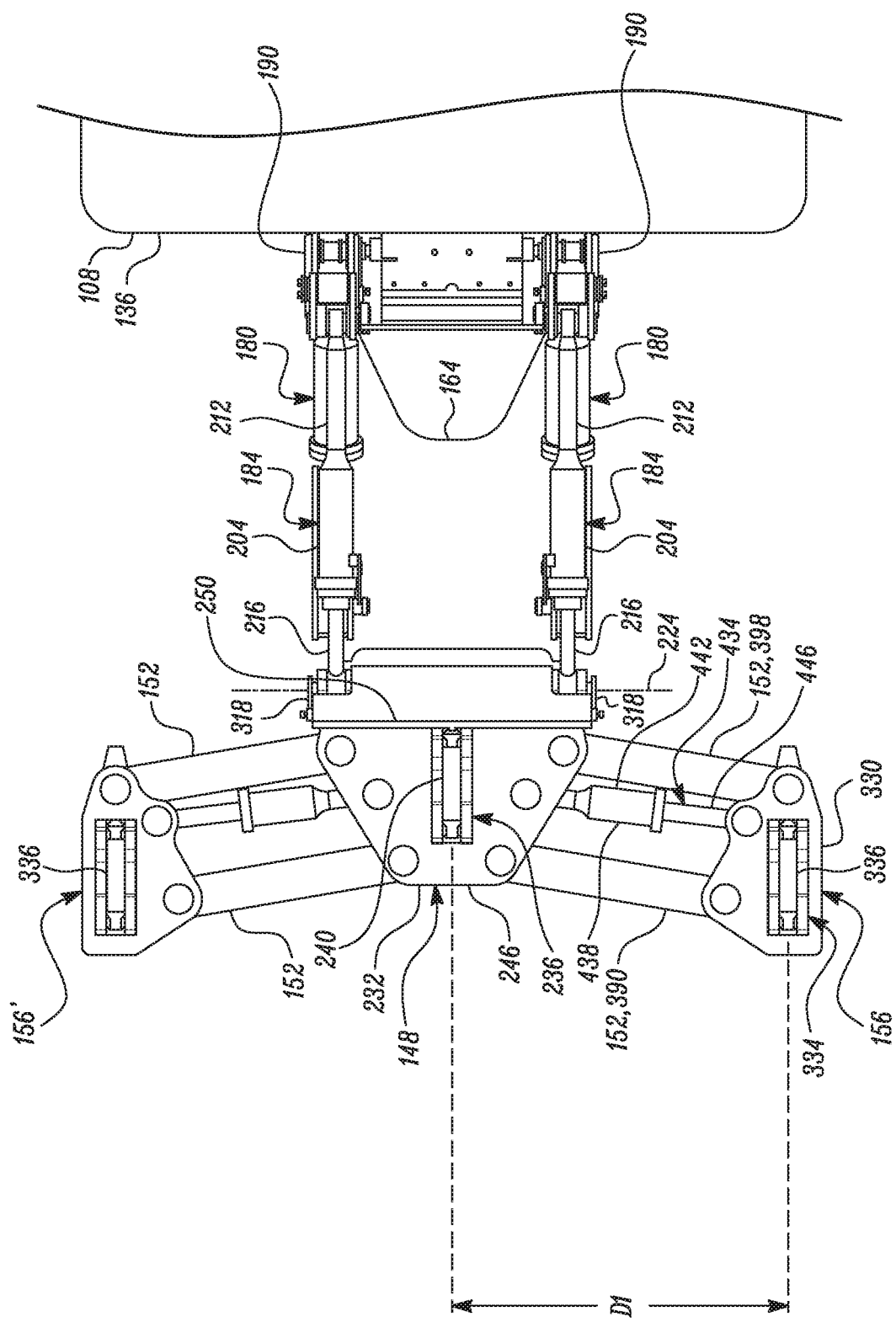
FIG. 7 is a top view of the ripper assembly depicting auxiliary ripper units of the ripper assembly in a first position with respect to a main ripper unit of the ripper assembly, in accordance with an embodiment of the present disclosure.
Figure 8:
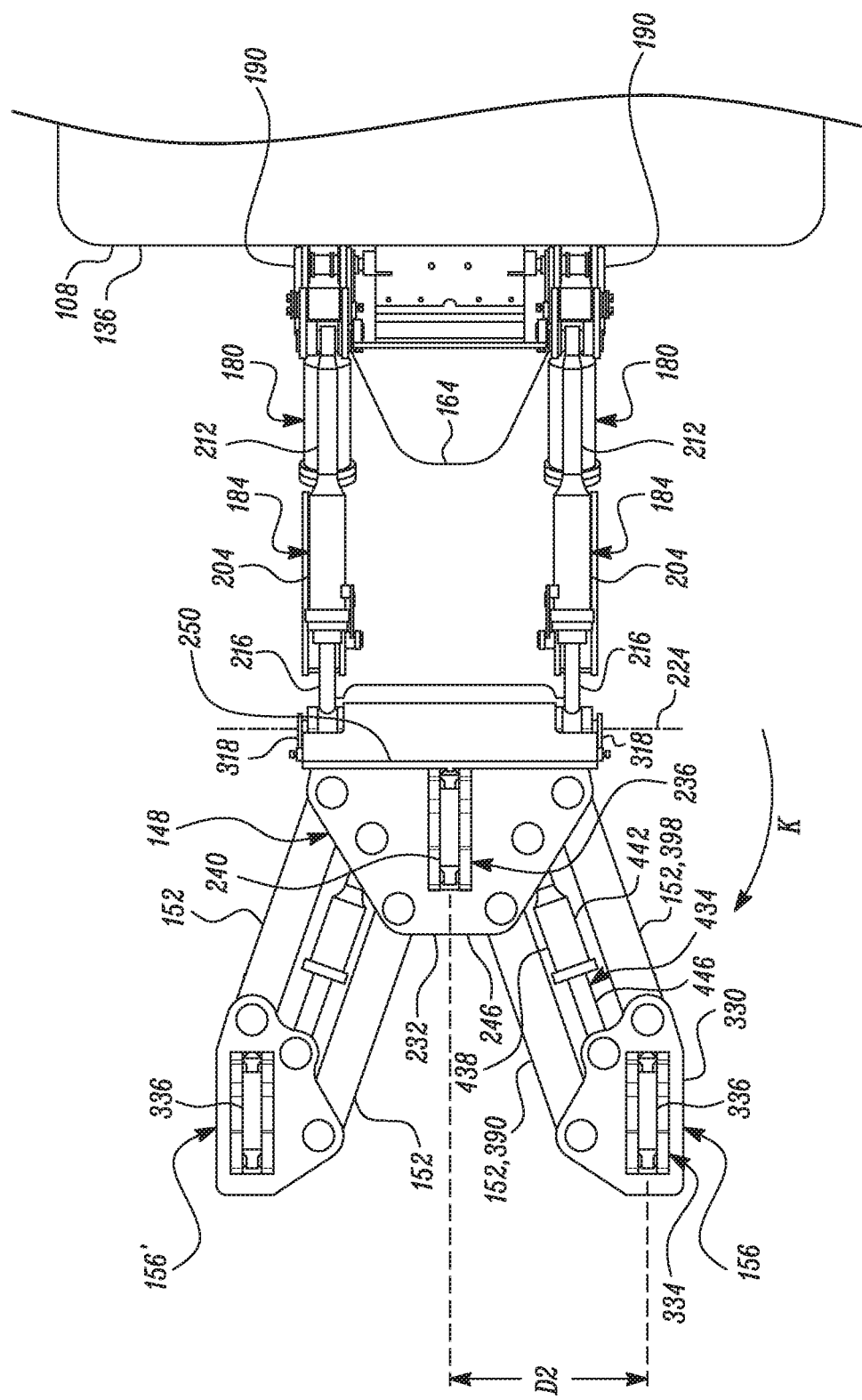
FIG. 8 is a top view of the ripper assembly depicting the auxiliary ripper units of the ripper assembly in a second position with respect to the main ripper unit of the ripper assembly, in accordance with an embodiment of the present disclosure.

Referring to FIGS. 7 and 8, it will be appreciated that a distance between the main ripper 240 (of the main ripper unit 148) and the auxiliary ripper 336 (of the auxiliary ripper unit 156), defined laterally in relation to a direction of travel of the machine 100 (i.e., direction, T), varies as the auxiliary ripper unit 156 pivots from the first position to the second position (or from the second position to the first position). According to the embodiment disclosed, a distance, D1, between the main ripper 240 (of the main ripper unit 148) and the auxiliary ripper 336 (of the auxiliary ripper unit 156), defined laterally in relation to the direction of travel of the machine 100 (i.e., direction, T), decreases to distance, D2, as the auxiliary ripper unit 156 pivots from the first position to the second position. Conversely, the distance increases (i.e., from D2 to D1) as the auxiliary ripper unit 156 pivots from the second position to the first position.

Referring again to FIG. 3, to power the movement of the auxiliary ripper unit 156 with respect to the main ripper unit 148 between the first position and the second position, the ripper assembly 128 includes an actuator 434 (also referred to as a pivot actuator 434). According to one example, the pivot actuator 434 includes a fluid actuator 438 with a cylinder 442 and a rod 446 telescopically extendable and retractable relative to the cylinder 442. The cylinder 442 is coupled to one of the auxiliary ripper unit 156 or the main ripper unit 148 and the rod 446 is coupled to the other of the auxiliary ripper unit 156 or the main ripper unit 148. According to the depicted embodiment, the cylinder 442 is coupled to the second slab 232 (of the main ripper unit 148) and the rod 446 is coupled to the fourth slab 330 (of the auxiliary ripper unit 156).

An extension of the rod 446 relative to the cylinder 442 causes the auxiliary ripper unit 156 to move towards the first position and a retraction of the rod 446 relative to the cylinder 442 causes the auxiliary ripper unit 156 to move towards the second position. Because of the parallelepiped-based linkage arrangement 418, it may be noted that an orientation of the auxiliary ripper 336 remains unchanged as the auxiliary ripper unit 156 pivots between the first position and the second position (including any intermediate position between the first position and the second position)(see FIGS. 7 and 8 in conjunction). For example, the ground engaging tool 374 of the auxiliary ripper 336 remains oriented towards the forward end 132 of the frame 108 all throughout the movement of the auxiliary ripper unit 156 between the first position and the second position. Further, all throughout the movement of the auxiliary ripper unit 156 between the first position and the second position, the second plate 426 may be disposed or may remain generally parallel with respect to the first plate 422.

Effectively, with the ripper assembly 128 coupled to the rearward end 136 of the frame 108, the ripper assembly 128 trails the frame 108 during the movement of the machine 100 along direction, T, and during said movement, the main ripper 240 and the auxiliary ripper 336 (i.e., the auxiliary rippers 336 of both the first auxiliary ripper unit 156 and the second auxiliary ripper unit 156') may remain engaged with the ground 120 so as to alter the ground 120 as the machine 100 moves. Further, as the main ripper unit 148 articulates along the height, H, (when actuated by the first actuators 180 and/or second actuators 184 of the articulation mechanism 144) the first auxiliary ripper unit 156 and the second auxiliary ripper unit 156' may be movable along with the movement of the main ripper unit 148.

While two auxiliary ripper units (i.e., the first auxiliary ripper unit 156 and the second auxiliary ripper unit 156') are disclosed, additional or lesser auxiliary ripper units may be contemplated. Further, while many components of the ripper assembly 128 have been disclosed to be connected to the other by welding, such components (or a set of components) may also be integrally formed with respect to one another. Further, it is also possible for one or more of the components, or portions of such components, to be omitted. In some cases, the incorporation of some additional components may be contemplated. For example, an actuator, similar to the pivot actuator 434, may also be positioned between the first slab 228 and the third slab 326 as well, just as the pivot actuator 434 is positioned between the second slab 232 and the fourth slab 330. Such an actuator may be arranged and may function similarly as the pivot actuator 434 to facilitate a movement of the auxiliary ripper unit 156 between the first position and the second position. Moreover, the pivotably coupling of one components with another, as discussed in the present disclosure, may be facilitated by use of conventional couplers (see randomly annotated couplers 450), a structure of which may be contemplated by someone of skill in the art.

INDUSTRIAL APPLICABILITY

During operation, assuming that the articulation mechanism 144 is in the stowed position (FIG. 5), and the auxiliary ripper unit 156 is in the first position (FIG. 7) with respect to the main ripper unit 148, an operator may actuate the first actuators 180 and the second actuators 184 of the articulation mechanism 144 causing the rods 196 the first actuators 180 to extend (e.g., fully) relative to the cylinders 188 of the first actuators 180. As a result, the sub-frame structure 164 pivots about the portion 172 of the rearward end 136 of the frame 108, causing the end 176 of the sub-frame structure 164 to stoop lower towards the ground 120 (i.e., lower to the frame 108 in certain situations). In consequence, an assembly of the main ripper unit 148, the first auxiliary ripper unit 156, and the second auxiliary ripper unit 156', also moves and stoops closer towards the ground 120. At this point, or along with the movement of the rods 196 of the first actuators 180, the operator may actuate the second actuators 184 as well, causing the rods 216 of the second actuators 184 to extend (e.g., fully) relative to the cylinders 204 of the second actuators 184. As a result, the assembly of the main ripper unit 148, the first auxiliary ripper unit 156, and the second auxiliary ripper unit 156', tilts (outwardly, away from the frame 108) (arrow, P, see FIG. 6) relative to the end 176 of the sub-frame structure 164 about the sub-frame axis 220. At this stage, the articulation mechanism 144 is in the operational position.

In the stowed position (FIG. 5), the main ripper 240 of the main ripper unit 148 and the auxiliary rippers 336 of the first auxiliary ripper unit 156 and the second auxiliary ripper unit 156' may be located above the ground 120, without any contact to the ground 120. Conversely, in the operational position, the main ripper 240 of the main ripper unit 148 and the auxiliary rippers 336 of the first auxiliary ripper unit 156 and the second auxiliary ripper unit 156' may be in engagement with the ground 120. Because the shank portion 290 of the main ripper 240 of the main ripper unit 148 may be adjusted with respect to the first pair of slats 236, and because the shank portions 366 of the auxiliary rippers 336 of the first auxiliary ripper unit 156 and the second auxiliary ripper unit 156' may be adjusted with respect to the respective second pair of slats 334, in the operational position of the articulation mechanism 144, the main ripper 240 and the auxiliary rippers 336 may be adjusted to vary between the fully-down position and the fully-up position. The fully-down position of the main ripper 240 and the auxiliary rippers 336 may be applied to rip strata up to a maximum depth beneath the ground 120 (e.g., when the ground 120 is relatively soft), while the fully-up position of the main ripper 240 and the auxiliary rippers 336 may be applied to rip strata up to a minimum depth beneath the ground 120 (e.g., when the ground 120 is relatively hard).

In cases where the hardness of soil is relatively high, a portion of the ground 120 defined along a (lateral) gap between any two adjacent rippers may remain unaltered. Aspects of the present disclosure provides a ripper assembly (i.e., ripper assembly 128) with multiple rippers, where the horizontal (and lateral) distance between two adjacent rippers can be reduced or increased selectively according to the soil condition. The ripper assembly 128 as proposed and described in the present disclosure includes the first auxiliary ripper unit 156 and the second auxiliary ripper unit 156' to be movable between the first position and the second position with respect to the main ripper unit 148. The description further below will be discussed with respect to the auxiliary ripper unit 156, with such discussion remaining applicable to the second auxiliary ripper unit 156', as well.

During a movement from the first position to the second position, an operator may actuate the pivot actuator 434. Since in the first position, the rod 446 of the pivot actuator 434 may be extended with respect to the cylinder 442 of the pivot actuator 434, an actuation of the pivot actuator 434 to move the auxiliary ripper unit 156 from the first position to the second position means that the operator actuates the pivot actuator 434 causing the rod 446 of the pivot actuator 434 to retract relative to the cylinder 442 of the pivot actuator 434. As a result, the pivot actuator 434 induces a pulling action against the auxiliary ripper unit 156 (e.g., against the fourth slab 330 of the auxiliary ripper unit 156) causing the auxiliary ripper unit 156 to move towards the main ripper unit 148. However, because of the parallelepiped-based linkage arrangement 418, the pulling action of the pivot actuator 434 inevitably forces the auxiliary ripper unit 156 to be turned rearward (direction, K) (FIG. 8) of the main ripper unit 148 (opposite to the direction, T), thereby attaining the second position. As the auxiliary ripper unit 156 moves from the first position to the second position, the distance, D1, between the main ripper 240 and the auxiliary ripper 336, defined laterally in relation to the direction of travel of the machine 100 (i.e., direction, T), decreases to distance, D2, thus enabling the ripper assembly 128 to alter the ground 120 defined along a (lateral) gap between the adjacent rippers (i.e., between the main ripper 240 and the auxiliary ripper 336).

With the auxiliary ripper unit 156 being movable between the first position and the second position, the ground 120 may thus be effectively altered—and such alteration may be possible without the need to replace the ripper assembly 128 with a new ripper assembly having more closely positioned rippers—this reduces machine downtime and operator effort. In some cases, the auxiliary ripper unit 156 may be dynamically moved between the first position and the second position even while a ripping operation is in progress. This enables the ripper assembly 128 of the machine 100 to effectively alter the ground 120 when encountering intermittent hard and soft soil over a travel path. Further, with the ripper assembly 128 including adjustable rippers, a need to execute numerous passes over and across the same portion of the ground 120 to attain the minimum degree of ground alteration may be avoided, in turn improving work efficiency, reducing effort, mitigating undue fuel consumption, and enhancing operator convenience, comfort, and site productivity.

It will be apparent to those skilled in the art that various modifications and variations can be made to the system of the present disclosure without departing from the scope of the disclosure. Other embodiments will be apparent to those skilled in the art from consideration of the specification and practice of the system disclosed herein. It is intended that the specification and examples be considered as exemplary only, with a true scope of the disclosure being indicated by the following claims and their equivalent.

What is claimed is:

1. A ripper assembly for a machine, the ripper assembly comprising:
    a main ripper unit adapted to be coupled to a frame of the machine and being moveable relative to the frame along a height of the machine, the main ripper unit including a main ripper adapted to rip strata up to a depth beneath a surface underlying the main ripper unit, the main ripper unit further including a first pair of slats extending between a first pair of slabs, the main ripper arranged within a space dined between the first pair of slats; and
    at least one auxiliary ripper unit pivotably coupled to the main ripper unit, the at least one auxiliary ripper unit being pivotable between a first position and a second position with respect to the main ripper unit,
    wherein a distance between the main ripper unit and the at least one auxiliary ripper unit, defined laterally in relation to a direction of travel of the machine, varies as the at least one auxiliary ripper unit pivots from the first position to the second position.

2. The ripper assembly as claimed in claim 1, wherein the at least one auxiliary ripper unit includes an auxiliary ripper, and an orientation of the auxiliary ripper remains unchanged as the at least one auxiliary ripper unit pivots between the first position and the second position.

3. The ripper assembly as claimed in claim 1, wherein,
    as the at least one auxiliary ripper unit is pivoted towards the first position, the at least one auxiliary ripper unit moves relatively closer to the frame,
    as the at least one auxiliary ripper unit is pivoted towards the second position, the at least one auxiliary ripper unit moves relatively farther from the frame, and
    the distance between the main ripper unit and the at least one auxiliary ripper unit, defined laterally in relation to the direction of travel of the machine, decreases as the at least one auxiliary ripper unit pivots from the first position to the second position.

4. The ripper assembly as claimed in claim 1 including:
    a first link and a second link spaced apart from the first link, each of the first link and the second link being pivotably coupled to the main ripper unit about a first axis and being pivotably coupled to the at least one auxiliary ripper unit about a second axis; and
    a third link and a fourth link spaced apart from the third link, each of the third link and the fourth link being pivotably coupled to the main ripper unit about a third axis and being pivotably coupled to the at least one auxiliary ripper unit about a fourth axis.

5. The ripper assembly as claimed in claim 4, wherein each of the first axis, the second axis, the third axis, and the fourth axis, are generally parallelly defined with respect to each other.

6. The ripper assembly as claimed in claim 4 including:
    a first plate coupled to and extending integrally and contiguously between the first link and the second link, and
    a second plate coupled to and extending integrally and contiguously between the third link and the fourth link.

7. The ripper assembly as claimed in claim 1 including an actuator configured to move the at least one auxiliary ripper unit between the first position and the second position.

8. The ripper assembly as claimed in claim 7, wherein the actuator includes a fluid actuator with a cylinder and a rod telescopically extendable and retractable relative to the cylinder, the cylinder being coupled to one of the at least one auxiliary ripper unit or the main ripper unit and the rod being coupled to the other of the at least one auxiliary ripper unit or the main ripper unit, wherein an extension of the rod relative to the cylinder causes the at least one auxiliary ripper unit to move towards the first position and a retraction of the rod relative to the cylinder causes the at least one auxiliary ripper unit to move towards the second position.

9. The ripper assembly as claimed in claim 1, wherein the first pair slabs includes a first slab and a second slab spaced apart with respect to the first slab, the first pair of slats arranged between the first slab and the second slab.

10. The ripper assembly as claimed in claim 9, wherein the at least one auxiliary ripper unit includes a third slab, a fourth slab spaced apart with respect to the third slab, and a second pair of slats arranged between the third slab and the fourth slab, wherein the at least one auxiliary ripper unit includes an auxiliary ripper arranged within a space defined between the second pair of slats.

11. A machine, comprising:

a frame defining a forward end and a rearward end;

an implement coupled to the forward end and adapted to receive material during a travel of the machine in a direction defined from the rearward end towards the forward end;

a ripper assembly coupled to the rearward end, the ripper assembly including:

a main ripper unit coupled to the frame and being moveable relative to the frame along a height of the machine, the main ripper unit including a main ripper adapted to rip strata up to a depth beneath a surface underlying the main ripper unit;

at least one auxiliary ripper unit pivotably coupled to the main ripper unit, the at least one auxiliary ripper unit being pivotable between a first position and a second position with respect to the main ripper unit; and a first link and a second link spaced apart from the first link, each of the first link and the second link being pivotably coupled to the main ripper unit about a first axis and being pivotably coupled to the at least one auxiliary ripper unit about a second axis, wherein a distance between the main ripper unit and the at least one auxiliary ripper unit, defined laterally in relation to a direction of travel of the machine, varies as the at least one auxiliary ripper unit pivots from the first position to the second position.

12. The machine as claimed in claim 11, wherein the at least one auxiliary ripper unit includes an auxiliary ripper, and an orientation of the auxiliary ripper remains unchanged as the at least one auxiliary ripper unit pivots between the first position and the second position.

13. The machine as claimed in claim 11, wherein, as the at least one auxiliary ripper unit is pivoted towards the first position, the at least one auxiliary ripper unit moves relatively closer to the frame, as the at least one auxiliary ripper unit is pivoted towards the second position, the at least one auxiliary ripper unit moves relatively farther from the frame, and the distance between the main ripper unit and the at least one auxiliary ripper unit, defined laterally in relation to the direction of travel of the machine, decreases as the at least one auxiliary ripper unit pivots from the first position to the second position.

14. The machine as claimed in claim 11, further including:

a third link and a fourth link spaced apart from the third link, each of the third link and the fourth link being pivotably coupled to the main ripper unit about a third axis and being pivotably coupled to the at least one auxiliary ripper unit about a fourth axis.

15. The machine as claimed in claim 14, wherein each of the first axis, the second axis, the third axis, and the fourth axis, are generally parallelly defined with respect to each other.

16. The machine as claimed in claim 14 including:

a first plate coupled to and extending integrally and contiguously between the first link and the second link, and a second plate coupled to and extending integrally and contiguously between the third link and the fourth link.

17. The machine as claimed in claim 11, wherein the main ripper unit includes a first slab, a second slab spaced apart with respect to the first slab, and a first pair of slats arranged between the first slab and the second slab, wherein the main ripper is arranged within a space defined between the first pair of slats.

18. The machine as claimed in claim 17, wherein the at least one auxiliary ripper unit includes a third slab, a fourth slab spaced apart with respect to the third slab, and a second pair of slats arranged between the third slab and the fourth slab, wherein the at least one auxiliary ripper unit includes an auxiliary ripper arranged within a space defined between the second pair of slats.

19. The machine as claimed in claim 11 including an actuator configured to move the at least one auxiliary ripper unit between the first position and the second position.

20. The machine as claimed in claim 19, wherein the actuator includes a fluid actuator with a cylinder and a rod telescopically extendable and retractable relative to the cylinder, the cylinder being coupled to one of the at least one auxiliary ripper unit or the main ripper unit and the rod being coupled to the other of the at least one auxiliary ripper unit or the main ripper unit, wherein an extension of the rod relative to the cylinder causes the at least one auxiliary ripper unit to move towards the first position and a retraction of the rod relative to the cylinder causes the at least one auxiliary ripper unit to move towards the second position.

\* \* \* \* \*